United States Patent [19]

Wilson

[11] 4,033,632

[45] July 5, 1977

[54] CONTROL VALVE DEVICE WITH CHANGE-OVER MEANS FOR DIRECT OR GRADUATED RELEASE OPERATION

[75] Inventor: Richard L. Wilson, Monroeville, Pa.

[73] Assignee: Westinghouse Air Brake Company, Wilmerding, Pa.

[22] Filed: Oct. 21, 1976

[21] Appl. No.: 734,393

[52] U.S. Cl. .................................. 303/74; 303/36
[51] Int. Cl.² ........................................ B60T 15/52
[58] Field of Search ............ 303/27, 28, 32, 36–39, 303/69, 72, 74

[56] References Cited

UNITED STATES PATENTS

| 1,502,521 | 7/1924 | Neal | 303/27 |
| 1,526,777 | 2/1925 | Dean | 303/32 |
| 1,526,779 | 2/1925 | Farmer | 303/32 |
| 2,940,798 | 6/1960 | Weber | 303/28 |
| 3,370,893 | 2/1968 | McClure et al. | 303/36 |

Primary Examiner—Duane A. Reger
Attorney, Agent, or Firm—W. F. Poore; R. W. McIntire, Jr.

[57] ABSTRACT

A brake control valve device, for railway vehicles, embodies means to enable this control valve device to be selectively conditioned for effecting either a direct release of the brakes or a graduated release of the brakes accordingly as a removable selector valve cover member having a ported face is secured to a ported face formed on the exterior surface of the control valve device in either a first or a second position with respect to this ported face on the control valve device.

12 Claims, 4 Drawing Figures

CONTROL VALVE DEVICE WITH CHANGE-OVER MEANS FOR DIRECT OR GRADUATED RELEASE OPERATION

BACKGROUND OF THE INVENTION

In the copending patent application, Ser. No. 650,297, of Richard L. Wilson, filed Jan. 19, 1976, and assigned to the assignee of the present application, there is shown and described a graduated release type brake control valve device that is operated by a reduction in brake pipe pressure on one side of a movable abutment relative to control reservoir pressure on the other side wherein the abutment embodies therein a control reservoir charging valve mechanism, a filter and a choke arranged in series. This charging valve mechanism comprises a two-position valve that, while in one position, enables the flow of fluid under pressure from a train brake pipe to a control reservoir thereby providing for the charging of this reservoir to the pressure carried in the train brake pipe, and, upon movement to the other position in response to a reduction of pressure in the train brake pipe, closes this charging communication thereby enabling the trapped pressure in the control reservoir to operate this brake control valve device to effect graduated brake applications and releases in accordance with variations of the pressure in the train brake pipe.

Since the rolling stock of most railroads comprise some vehicles that require a graduated release type brake control valve device to provide the proper braking for the type of service in which these vehicles are used, and other vehicles that require a direct release type brake control valve device to provide the proper braking for the type of service in which these other vehicles are used, it is apparent that it would be most desirable to provide a railway vehicle brake control valve device with a change-over means whereby this brake control valve device may be selectively conditioned for either graduated release operation or direct release operation.

Accordingly, it is the general purpose of the present invention to provide a railway vehicle brake control apparatus that embodies a brake control valve device that may be selectively conditioned to operate either in the manner of a graduated release type brake control valve device, or in the manner of a direct release type brake control valve device.

SUMMARY OF THE INVENTION

According to the present invention, a railway vehicle brake control apparatus embodies a brake control valve device to which may be removably secured, in either one of two positions, a valve cover member in which is provided a plurality of passageways that, when this cover member is secured to the brake control valve device in one of its two positions, so connect a certain plurality of passageways in the brake control valve device whereby this valve device is enabled to operate in the manner of a graduated release type brake control valve device, and, when secured to the brake control valve device in the other one of its positions, so connect a certain other plurality of passageways in the brake control valve device that it is enabled to operate in the manner of a direct release type brake control valve device.

DESCRIPTION

Figure 1:
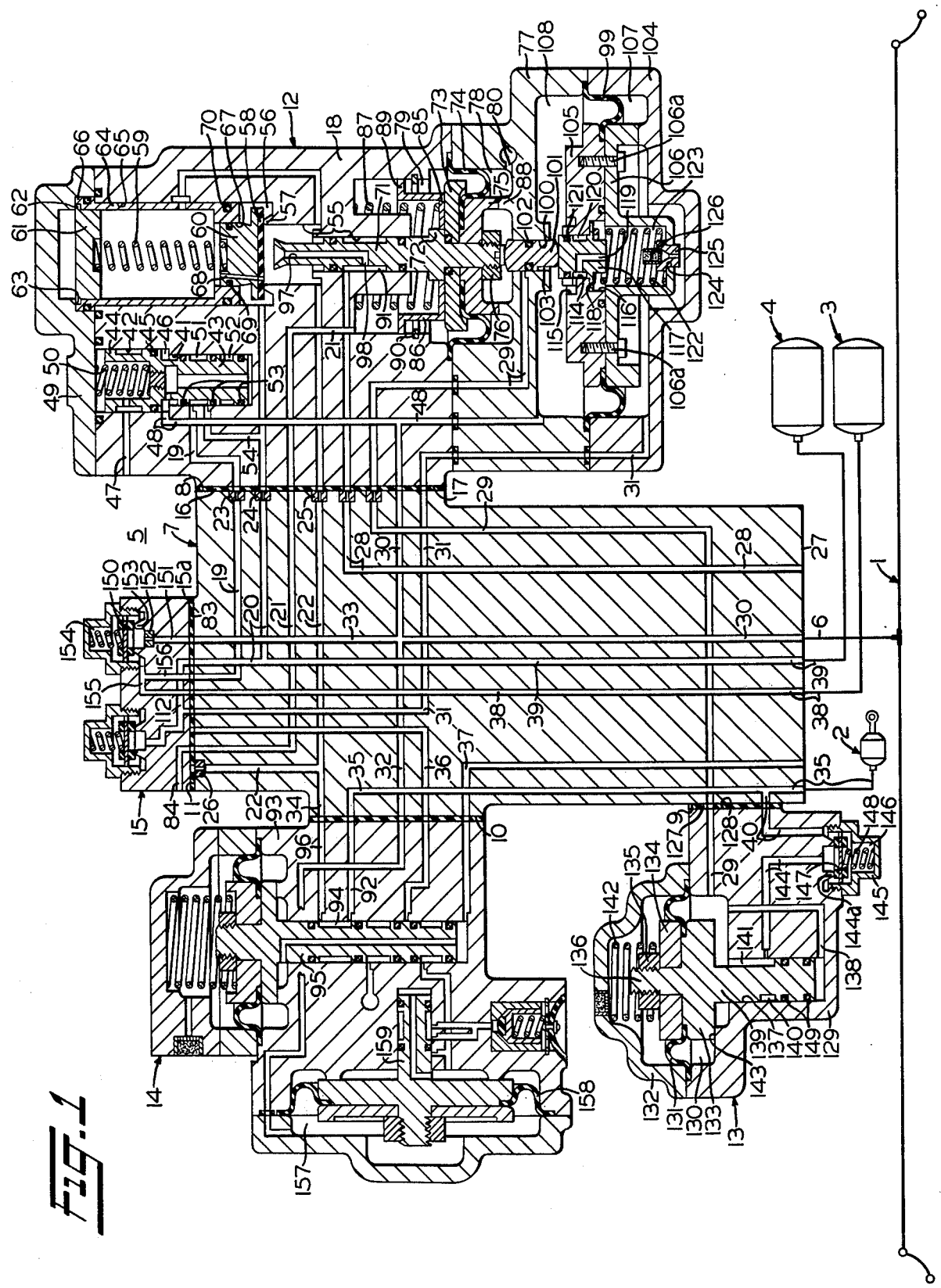
FIG. 1 is a diagrammatic view of a railway vehicle fluid pressure brake control apparatus embodying the invention.

Referring to FIG. 1 of the drawings, a railway vehicle brake contol apparatus embodying the invention comprises a brake pipe 1 that extends from end to end of the vehicle, a brake cylinder 2, a pair of fluid pressure storage reservoirs 3 and 4, and a brake control valve device 5 connected to the brake pipe 1 by a branch pipe 6 and controlled by variations in pressure therein, to effect the supply of fluid under pressure to and from the brake cylinder 2.

The brake control valve device 5 may comprise a pipe bracket 7 having thereon four gasket faces 8, 9, 10 and 11, a service or triple valve device or portion 12, a quick service cut-out valve device 13, a quick release valve device 14, and a removable graduated or direct release valve cover 15.

As shown in FIG. 1 of the drawings, the service valve device 12 is secured by any suitable means (not shown) to the gasket face 8 of the pipe bracket 7, there being a ported gasket 16 disposed between the gasket face 8 on the pipe bracket 7 and a gasket face 17 formed on the left-hand side of a casing section 18 of the service valve device 12.

Extending from the vertical gasket face 8 on the pipe bracket 7 through this bracket and opening at the horizontal gasket face 11 on this bracket are four ports and passageways 19, 20, 21 and 22. Chokes 23, 24, and 25 are disposed respectively in that end of the passageways 19, 20 and 22 that open at the vertical gasket face 8 on the pipe bracket 7, and a choke 26 is disposed in that end of the passageway 22 that opens at the horizontal gasket face 11. The size of these chokes control the rate of flow of fluid under pressure through the respective passageway.

Extending from the vertical gasket face 8 through the pipe bracket 7 and opening at a flat surface 27 on the lower side of this bracket is an exhaust passageway 28.

Furthermore, extending from the vertical gasket face 8 through the pipe bracket 7 are three passageways 29, 30 and 31. The passageways 29 and 31 open respectively at the vertical gasket face 9 and the horizontal gasket face 11 on the pipe bracket 7, and passageway 30 opens at the flat surface 27 on the bottom of this pipe bracket 7.

As shown in FIG. 1, the branch pipe 6 is connected to that end of the passageway 30 that opens at the flat surface 27, and opening into this passageway 30 intermediate the ends thereof is one end of two passageways 32 and 33. The passageway 32 extends through the pipe bracket 8 and opens at its other end at the vertical gasket face 10, and the passageway 33 extends through this bracket and opens at its other end at the horizontal gasket face 11.

Moreover, as shown in FIG. 1, the pipe bracket 7 is further provided with seven additional passageways 34, 35, 36, 37, 38, 39 and 40.

The passageway 34 opens at one end at the gasket face 10 and at its opposite end into the passageway 22 intermediate the ends thereof. The passageway 35 opens at one end at the gasket face 10 and at its opposite end is connected by a correspondingly numbered pipe to the brake cylinder 2. The passageway 36 opens at one end at the vertical gasket face 10 and at its other end at the horizontal gasket face 11. The passageway 37 opens at other end at the vertical gasket face 10 and at its opposite end at the flat surface 27 on the bottom of the pipe bracket 7. The passageways 38 and 39 open at their upper end at the horizontal gasket face 11 and at their lower end are connected respectively by correspondingly numbered pipes to the hereinbefore-mentioned reservoirs 3 and 4. Finally, the passageway 40 opens at one end at the vertical gasket face 9 and at its other end into the passageway 35 intermediate the ends thereof.

The gasket face 17 formed on the left-hand side of the casing section 18 of the service valve device 12 corresponds to the gasket face 8 on the pipe bracket 7 in that opening at the surface of this gasket face 17 are the same number of ports as open at the surface of the gasket face 8, these ports being identically arranged therein and opening from corresponding passageways in the casing section 18 so that when the ported gasket 16 is placed between these two gasket faces and the casing section 18 is rigidly secured to the pipe bracket 7 by bolts or other suitable means (not shown), the passageways 19, 20, 21, 22, 28, 29, 30 and 31 in the pipe bracket 7 extend into corresponding passageways in the casing section 18.

The passageway 19 extends through the casing section 18 and opens at the wall surface of a bottomed bore 41 that is coaxial with a counterbore 42 in the casing section 18.

Slidably mounted in the bottomed bore 41 is a spool-type emergency valve 43 that has formed integral therewith at its upper end an actuating piston 44 which is slidably mounted in the counterbore 42.

The actuating piston 44 is provided with a peripheral annular groove in which is disposed an O-ring seal 45 that forms a seal with the wall surface of the counterbore 42 to prevent leakage of fluid under pressure between the periphery of the piston 44 and the wall of the counterbore 42 from a chamber 46 below this piston 44 to an atmospheric passageway 47 that at one end opens at the wall surface of the counterbore 42 at a location that is above the location at which one end of a passageway 48 opens at the wall surface of this counterbore 42. This passageway 47 extends through the casing section 18 and its other end opens at the exterior surface of the casing section 18.

The upper end of the counterbore 42 is closed by a top cover member 49 that is secured to the upper end of the casing section 18 by any suitable means (not shown), and a spring 50 is interposed between this cover member 49 and the piston 44 to, in the absence of fluid under pressure in the chamber 46, bias this piston 44 and the emergency valve 43 to the position shown in FIG. 1.

The emergency valve 43 is provided with two spaced-apart elongated peripheral annular grooves 51 and 52 and three peripheral annular grooves in each of which three grooves is disposed an O-ring seal 53 that forms a seal with the wall surface of the bottomed bore 41. These O-ring seals 53 prevent leakage of fluid under pressure from each of the elongated peripheral annular grooves 51 and 52 to the other and also from these grooves to the respective opposite ends of the bottomed bore 41.

While the piston 44 and emergency valve 43 are biased by the spring 50 to the position shown in FIG. 1, the groove 51 on this emergency valve 43 establishes a communication between that end of the passageway 19 that opens at the wall surface of the bottomed bore 41 and one end of a passageway 54 that opens at the wall surface of this bottomed bore 41 below the one end of the passageway 19. This passageway 54 extends through the casing section 18 and at its other end opens into the passageway 20 in the casing section 18 intermediate the ends thereof.

As shown in FIG. 1, the casing section 18 of the service valve device 12 is provided with a stepped bore 55 which opens at its lower end at the lower end of the casing section 18 and opens at its upper end into a chamber 56 formed by the cooperative relationship of the casing section 18 and the top cover member 49. At the upper end of the bore 55 there is formed an annular valve seat 57 against which is normally biased a resilient flat disc-type valve 58 by a spring 59 interposed between a piston member 60 to which this valve 58 is bonded and a spring seat 61 that at its upper end is provided with a flange 62. This flange 62 is disposed in a counterbore 63 provided therefor in the upper end of a bushing 64. This bushing 64 is disposed in a counterbore 65 provided therefor in the casing section 18 and has integral therewith at its upper end an out-turned flange 66 that is clamped between the upper end of the casing section 18 and the top cover member 49.

As shown in FIG. 1 of the drawings, the bushing 64 is provided with a bore 67 in which the piston member 60 is slidably disposed. A small bore 68 extends through the valve 58 and piston member 60 to prevent dash pot action, and a pair of O-ring seals 69 and 70 carried in peripheral annular grooves provided therefor respectively in the piston member 60 and bushing 65 prevent leakage of fluid under pressure from the chamber 56 into the counterbore 65 and interior of the bushing 64.

Opening into the chamber 56 is one of the hereinbefore-mentioned passageway 20 that extends through the casing section 18 and pipe bracket 7 and is connected by the hereinbefore-mentioned passageway and pipe 39 to the reservoir 4 so that fluid under pressure may be constantly supplied from this reservoir 4 to the chamber 56 via this pipe and corresponding passageway 39 and passageway 20.

Slidably mounted in the steped bore 55 is a valve stem 71 that intermediate its ends is provided with a collar 72 that abuts a diaphragm follower 73. The inner periphery of an annular diaphragm 74 is clamped between this diaphragm follower 73 and a diaphragm follower plate 75 that is secured to the diaphragm follower 73 by a nut 76 which has screw-threaded engagement with screw threads provided therefor on the lower end of the stem 71. The outer periphery of the diaphragm 74 is clamped between the casing section 18 and a lower casing section 77 of the service valve device 12.

The diaphragm 74 cooperates with the casing sections 18 and 77 to form within the brake control valve device 12 and on opposite sides of the diaphragm 74 a first pair of chambers 78 and 79. The chamber 78 is open to atmosphere via a passageway 80 that extends through the casing section 77 to the exterior surface thereof, and opening into the chamber 79 is one end of the hereinbefore-mentioned passageway 21. This passageway 21 extends through the casing section 18 and the pipe bracket 7 and at its other end is open at the surface of the gasket face 11 on this bracket 7 via a port in this gasket face, this port being indicated by the reference numeral 81 in FIG. 2 of the drawings which is a top view of this gasket face 11. The valve cover 15 is so constructed that, while it occupies a direct release position in which it is shown diagrammatically in FIG. 1, a port 82 in a flat gasket face 83 of this valve cover 15, a top view of which gasket face 83 is shown in FIG. 3, is in alignment with the port 81 in the gasket face 11. This port 82 is at one end of a passageway that extends through the valve cover 15 and at its other end is open at the exterior surface of this cover 15, this passageway being indicated diagrammatically in FIG. 1 by the reference numeral 84. Consequently, while the valve cover 15 occupies its direct release position, the chamber 79 above the diaphragm 74 is constantly open to atmosphere via passageway 21 that extends through the casing section 18 and pipe bracket 7, ports 81 and 82 and passageway 84 in valve cover 15.

As shown in FIG. 1 of the drawings, an inturned flange 85 formed on the lower end of a spring seat 86 abuts the upper side of the diaphragm follower 73, and a spring 87 is interposed between this flange 85 and the casing section 18 to normally bias the diaphragm follower plate 75 against a stop 88 formed on the casing section 77. The upper end of the spring seat 86 is provided with an out-turned flange 89 that is disposed above a snap ring 90 which is inserted into an annular groove provided therefor in the wall of the chamber 79. This snap ring 90 and out-turned flange 89 prevent the spring 87 from ejecting the valve stem 71 from the stepped bore 55 when the casing section 77 is disconnected from the casing section 18 when repairing or replacing broken or defective parts of the brake control valve device 12.

The valve stem 71 has formed thereon intermediate its ends an elongated peripheral annular groove 91 which, as shown in FIG. 1 of the drawings illustrating the relative positions of the parts of the brake control valve device 5 in the brake release position, is so located and arranged that the brake cylinder 2 is open to atmosphere via the pipe 35 and corresponding passageway in the pipe bracket 7, a first passageway 92 in a casing 93 of the hereinbefore-mentioned quick release valve device 14, an elongated peripheral annular groove 94 on a spool valve 95 of this valve device 14, a second passageway 96 in the casing 93, the passageways 34 and 22, choke 25 in passageway 22, the upper portion of stepped bore 55, a bottomed bore 97 and a port 98 formed in the valve stem 71, the groove 91 thereon, and the passageway 28 that at one end opens at the wall surface of the stepped bore 55 and at the other end is open to atmosphere.

The annular diaphragm 74 is operatively connected to a second annular diaphragm 99 in a manner now to be described.

As can be seen from FIG. 1 of the drawings, the casing section 77 is provided with a bore 100 at the wall surface of which opens one end of the thereinbefore-mentioned passageway 29. Slidably mounted in the bore 100 is a cylindrical quick service valve 101 on the periphery of which is formed an annular groove in which is disposed an O-ring seal 102 that forms a seal with the wall surface of the bore 100 so that, while the quick service valve 101 occupies the position shown in FIG. 1, the passageway 29 is cut off from a longitudinal groove 103 formed on the valve 101 and extending from a location just below the O-ring seal 102 to the lower end thereof.

The outer periphery of the diaphragm 99 is clamped between the casing section 77 and a bottom cover member 104 and the inner periphery is clamped between an annular diaphragm follower 105 and a cup-shaped diaphragm follower plate 106 that is secured to the diaphragm follower 105 by a plurality of cap screws 106a, only two of the which appear in FIG. 1 of the drawings, that pass through corresponding smooth bores in the follower plate 106 and have screw-threaded engagement with coaxial screw-threaded bottomed bores provided therefor in the diaphragm follower 105.

The diaphragm 99 cooperates with the casing section 77 and the bottom cover 104 to form within the brake control valve device 5 and on the opposite sides of the diaphragm 99 a second pair of chambers 107 and 108. Opening into the chamber 108 above the diaphragm 99 in the other end of the hereinbefore-mentioned passageway 48 so that the chamber 108 is charged with fluid under pressure from the brake pipe 1 via the branch pipe 6, passageway 30 and this passageway 48.

Opening into the chamber 107 below the diaphragm 99 is one end of the hereinbefore-mentioned passageway 31 that extends through the bottom cover member 104, casing sections 77 and 18, and the pipe bracket 7 and at its other end is open at the surface of the gasket face 11 on this bracket 7 via a port in this gasket face, this port being indicated by the reference numeral 109 in FIG. 2. The valve cover 15 is so constructed that, while it occupies its direct release position shown diagrammatically in FIG. 1, a port 110 (FIG. 3) in the gasket face 83 of valve cover 15 is in alignment with the port 109 in the gasket face 11. This port 110 is at one end of a passageway that extends through the valve cover 15 and at its other end opens into an L-shaped cavity 111 (FIG. 3) formed in the valve cover 15 and extending inward a chosen distance from the gasket face 83 of this cover 15, this passageway being indicated diagrammatically in FIG. 1 by the reference numeral 112.

The size of the L-shaped cavity 111 is such that while the valve cover 15 occupies its direct release position, this cavity 111 registers with a port 113 (FIG. 2) in the gasket face 11 on the pipe bracket 7, this port 113 being at that end of the hereinbefore-mentioned passageway 20 that opens at this gasket face 11. Consequently, while the valve cover 15 occupies its direct release position, the chamber 107 (FIG. 1) below the diaphragm 99 is connected to the reservoir 4 via the passageway 31 that extends through the bottom cover 104, casing sections 77 and 18, and pipe bracket 7, ports 109 (FIG. 2) and 110 (FIG. 3), passageway 112 (FIG. 1), cavity 111 (FIG. 3), port 113 (FIG. 2), passageway 20 (FIG. 1) and passageway and pipe 39.

In order to provide for the charging of the reservoir 4 from the brake pipe 1, the diaphragm follower 105 and diaphragm follower plate 106 embody therein a reservoir charging valve mechanism and a dissipation choke which now will be described.

As shown in FIG. 1 of the drawings, the diaphragm follower 105 is provided with a bore 114 that extends therethrough and two coaxial counterbores 115 and 116 that extend inward from the respective opposite sides thereof.

Slidably mounted in the bore 114 is a spool-type valve 117 that, intermediate its ends, is provided with an out-turned cylindrical flange 118. The diameter of this flange 118 is slightly less than the diameter of the counterbore 116. To enable this flange 118 to be slidable a chosen distance within the counterbore 116, the thickness of this flange is substantially less than the length of this counterbore 116. It will be noted from the drawings that the diaphragm follower plate 106 serves as a stop to limit the downward movement of this flange 118 and the valve 117, and that the upper end of the counterbore 116 constitutes a stop to limit their upper movement.

It will be further noted from FIG. 1 of the drawings that the valve 117 is provided with a passageway 119 that at one end opens at the lower end of valve 117 and at its other end opens at the bottom of an elongated peripheral annular groove 120 that is formed thereon above the out-turned flange 118 and below a peripheral annular groove adjacent the upper end thereof in which groove is disposed an O-ring seal 121.

In order to normally maintain the valve 117 in the position shown in which the upper end thereof abuts the lower end of the quick service valve 101 and the out-turned flange 118 thereon abuts the upper end of the counterbore 116, a spring 122, which is lighter than the spring 87, is interposed between this flange 118 and the bottom of the cup-shaped portion of the diaphragm follower plate 106.

While the spring 122 biases the flange 118 against the upper end of the counterbore 116, the groove 120 on the valve 117 is in alignment with the counterbore 115 thus establishing a communication from the chamber 108 to a chamber 123 formed by the cooperative relationship of the cup-shaped portion of the diaphragm follower plate 106, the lower end of the valve 117 and the out-turned flange 118 thereon.

As shown in FIG. 1 of the drawings, extending through the bottom of the cup-shaped portion of the diaphragm follower plate 108 is a bore 124 in which is secured, as, for example, by a press-fit, a choke fitting 125. This choke fitting 125 may be the same in construction as the choke fitting shown in U.S. Pat. No. 2,457,578, issued Dec. 28, 1948 to Charles W. Maliphant, and assigned to the assignee of the present application. As disclosed in this patent, this choke fitting 125 embodies therein a fluid straining element 126.

As shown in FIG. 1, the quick service cut-out valve device 13 is secured by any suitable means (not shown) to the gasket face 9 of the pipe bracket 7, there being a ported gasket 127 disposed between the gasket face 9 on the pipe bracket 7 and a gasket face 128 formed on the righthand side of a body 129 of the quick service cut-out valve device 13.

The gasket face 128 on the body 129 corresponds to the gasket face 9 on the pipe bracket 7 in that opening at the surface of the gasket face 128 are the same number of ports as open at the surface of the gasket face 9, these ports being identically arranged therein and opening from corresponding passageways in the body 129 so that when the ported gasket 127 is placed between these two gasket faces and the body 129 secured to the pipe bracket 7 by any suitable means (not shown), the passageways 29 and 40 in the pipe bracket 7 extend into corresponding passageways in the body 129.

The passageway 29 extends through the body 129 and opens into a chamber 130 formed between the upper end of this body and the lower side of a diaphragm 131 the outer periphery of which is clamped between the body 129 and a cover member 132 secured to this body by any suitable means (not shown).

The inner periphery of the diaphragm 131 is clamped between an annular diaphragm follower 133 and a diaphragm follower plate 134 that is secured to the diaphragm follower by a nut 135 that has screw-threaded engagement with screw threads formed on a stem 136 that extends upward from the upper side of the diaphragm follower 133.

The body 129 is provided with a blind bore 137 into the bottom of which opens one end of a passageway 138 that extends through the body 129 and at its oopposite end opens into the chamber 130 to prevent dash-pot action.

Slidably mounted in the bottomed bore 137 is a spool-type valve 139 the upper end of which is integral with the diaphragm follower 133. The valve 139 is provided with an elongated peripheral annular groove 140 and a longitudinal groove 141 that at one end opens into the annular groove 140 and at the other end into the chamber 130.

A spring 142 interposed between the follower plate 134 and the cover member 132 is normally effective to bias the diaphragm follower 133 against a stop surface 143 formed on the casing 129. While the spring 142 biases the diaphragm follower 133 against the stop surface 143, the grooves 141 and 140 establish a communication between the chamber 130 and one end of a passageway 144 that opens at the wall surface of the bottomed bore 137. This passageway 144 extends through the body 129 and opens within an annular valve seat 144a formed on the body 129. A screw-threaded cap 145 that has screw-threaded engagement with screw threads provided therefor in the body 129 cooperates with this body 129 to form a chamber 146 into which opens the passageway 40. Disposed within the chamber 146 is a flat disc-type valve 147 between which and the cap 145 is interposed a spring 148 that is normally effective to bias this valve 147 against the seat 144a to close communication between the passageway 144 and the chamber 146.

The spool valve 139 below the elongated peripheral annular groove 140 thereon is provided with two spaced-apart peripheral annular grooves in each of which is disposed an O-ring seal 149. The purpose of these O-ring seals 149 is to prevent flow of fluid under pressure from the chamber 130 and the passageway 138 to the passageway 144 when the pressure in the chamber 130 is increased sufficiently to deflect the diaphragm 131 upward against the yielding resistance of the spring 142 and thereby shift the spool valve 139 upward to a position in which the O-ring seals 149 respectively form seals with the wall surface of the bottomed bore 137 above and below the location at which the one end of the passageway 144 opens at this wall surface.

The quick release valve device 14 of the brake control valve device 5 may be substantially the same in construction and operation as the quick release valve device 4 and the selector valve device 5 shown in U.S. Pat. No. 2,937,906 issued May 24, 1960 to Harry C. May, and assigned to the assignee of the present application. Since this quick release valve device 14 operates in the same manner as the quick release valve device 4 and selector valve device 5 shown in the above-mentioned patent, a detailed description of this quick release valve device 14 is deemed unnecessary to an understanding of the present invention.

OPERATION

A. Direct Release Operation

While the removable valve cover 15 is secured to the gasket face 11 on the pipe bracket 7 in its direct release position (FIG. 1), with a ported gasket 15a disposed between the gasket face 11 and the gasket face 83 of this valve cover 15, the hereinbefore-described ports and passageways in this valve cover 15 establish the connections between the passageways in the pipe bracket 7 as shown diagrammatically in FIG. 1 of the drawings. Therefore, the brake control valve device 5 is conditioned for direct release operation.

Let it be assumed that the brake control valve device 5 is provided on a railway freight car that is one car in a train of cars that are hauled by a locomotive which is provided with an engineer's brake valve device (not shown) that in construction and operation is the same as the engineer's brake valve device shown and described in U.S. Pat. No. 2,958,561 issued Nov. 1, 1960, to Harry C. May, and assigned to the assignee of the present application.

Let it be further assumed that a manually positionable selector valve device of the above-mentioned engineer's brake valve device is set in that one of its positions referred to in U.S. Pat. No. 2,958,561 as freight position.

Initial Charging

Assume initially that all the passageways and chambers in the brake control valve device 5 shown in FIG. 1 of the drawings are devoid of fluid under pressure, that the various parts of the brake control valve device 5 are in the respective positions in which they are shown in FIG. 1, that a main reservoir (not shown) on the locomotive is charged with fluid under pressure to a chosen pressure and connected to the engineer's brake valve device, and that it is desired to initially charge the brake apparatus on all the cars in the train. To effect initial charging of the brake apparatus on all the cars in the train, the engineer will move a handle (not shown) of the engineer's brake valve device to its running (i. e., release) position to cause the supply of fluid under pressure from the main reservoir to the train brake pipe and, therefore, to the brake pipe 1 shown in FIG. 1.

On a car that is equipped with the brake control valve device 5, fluid under pressure flows from the brake pipe 1 to the chamber 46 below the piston 44 via the branch pipe 6, and passageways 30 and 48.

As the pressure in the chamber 46 is increased, the piston 44 is moved upward against the yielding resistance of the spring 50 until the piston 44 abuts the top cover member 49. In this upper position, the center one of three O-ring seals 53 carried by the emergency valve 43 forms a seal with the wall surface of the bottomed bore 41 at a location above the location at which the one end of the passageway 54 opens at this wall surface and below the location at which the passageway 19 opens at this wall surface. Thus, communication between the passageways 19 and 54 is closed.

Fluid under pressure supplied from the brake pipe 1 to the passageway 48 will also flow to the chamber 108 above the diaphragm 99. While the parts of the brake control valve device 5 occupy the position in which they are shown in FIG. 1 of the drawings, fluid under pressure supplied to the chamber 108 above the diaphragm 99 will flow to the chamber 107 below this diaphragm 99 via groove 120 and passageway 119 in valve 117, chamber 123 and choke fitting 125, and thence to the reservoir 4, which constitutes an auxiliary reservoir while the brake control valve device 5 is conditioned for both direct release and graduated release operation, via passageways 32, 112, and 20 and passageway and pipe 39, until the pressure in the chamber 107 and the auxiliary reservoir 4 is increased to the normal fully charged pressure carried in the brake pipe 1, it being noted that the size of the choke fitting 125 determines the rate at which the chamber 107 and the auxiliary reservoir 4 are charged.

Some of the fluid supplied from the brake pipe 1 to the passageway 30 flows to the lower side of a spring-loaded check valve 150 (FIG. 1) in the valve cover 15 via the passageway 33 in the pipe bracket 7, a passageway 151 in the valve cover 15 and a choke 152 in this passageway 151. When the check valve 150 is thus unseated from a valve seat 153, fluid under pressure will flow from passageway 151 to a chamber 154 and thence to the reservoir 3, which constitutes an emergency reservoir, via a passageway 155 in the valve cover 15 and the passageway and pipe 38 until the pressure in this reservoir 3 is increased to the normal fully charged pressure carried in the brake pipe 1, which, for example, may be seventy pounds per square inch.

It will be noted from FIG. 1 that some of the fluid under pressure supplied to the passageway 155 flows to the passageway 19 via a passageway 156 in the valve cover 15. However, the fluid under pressure supplied to the chamber 46, as hereinbefore explained, has moved the emergency valve 43 to its upper position so that communication is closed between passageways 19 and 54.

Moreover, some of the fluid under pressure supplied to the passageway 30 flows to a chamber 157 at the left-hand side of a diaphragm 158 in the quick release valve device 14 via the passageway 32 which extends through the pipe bracket 7 and the casing 93 of this valve device 14. Fluid under pressure thus supplied to the chamber 157 is effective to maintain the diaphragm 158 and a spool valve 159 operatively connected thereto in the position shown in FIG. 1.

SERVICE APPLICATION OF THE BRAKES

In effecting a service application of the brakes, initiation of such an application will be effected by the engineer moving the handle of the brake valve device from its running position into its application zone to a position corresponding to the degree of brake application desired, whereupon this brake valve device effects a reduction of the pressure in the brake pipe 1 and the chamber 108 above diaphragm 99 at a service rate in the manner described in the hereinbefore-mentioned U.S. Pat. No. 2,958,561.

The size of the choke fitting 125 is such that the flow of fluid under pressure therethrough is less than a service rate. Therefore, fluid under pressure cannot flow from the chamber 107 to the chamber 108 and thence to the brake pipe 1 via this choke fitting 125, chamber 123, passageway 119 in and groove 120 on valve 117, bore 114, and counterbore 115 as fast as fluid under pressure is flowing from the chamber 108 to atmosphere via the train brake pipe and the brake valve device.

Accordingly, it is apparent that the pressure in the chamber 107 will quickly exceed the pressure in the chamber 108 and that this higher pressure in the chamber 107 will deflect the diaphragm 99 in an upward direction, as viewed in FIG. 1 of the drawings. Since the spring 122 is lighter than the spring 87, as hereinbefore stated, the initial upward deflection of the diaphragm 99 will shift the diaphragm follower 105, and diaphragm follower plate 106 upward relative to the quick service valve 101 and spool valve 117 until the flange 118 on this valve 117 abuts the diaphragm follower plate 106.

As the diaphragm follower 105 is thus shifted upward relative to valve 117 until flange 118 abuts diaphragm follower plate 106, the O-ring seal 121 carried by valve 117 is moved to a position in which this O-ring seal 121 forms a seal with the wall surface of the bore 114 at a location below the upper end thereof.

While the O-ring seal 121 forms a seal with the wall surface of the bore 114, communication is cut off between chambers 108 and 107.

As the pressure in the chamber 108 continues to be reduced by flow of fluid under pressure therefrom to atmosphere via the train brake pipe and the brake valve device, the difference in the pressures in the chambers 107 and 108 will increase to further deflect the diaphragm 99 in an upward direction.

Since the flange 118 on the valve 117 now abuts the diaphragm follower plate 106, this upward deflection of the diaphragm 99, diaphragm follower 105, valve 117 and diaphragm follower plate 106 is transmitted to the valve stem 71 via the quick service valve 101 to move this valve 101 and the stem 71 upward.

The length of the valve stem 71 is such that the O-ring seal 102 carried by the quick service valve 101 is moved to a position in which it forms a seal with the wall surface of the bore 100 at a location just above the location at which the one end of the passageway 29 opens at the wall surface of this bore before the upper end of this stem 71 lifts the disc valve 58 upward from its seat 57.

Upon movement of the quick service valve 101 to the position in which the O-ring seal 102 carried thereon forms a seal with the wall surface of the bore 100 just above the location at which the one end of the passageway 29 opens at this wall surface, fluid under pressure will flow from the brake pipe 1 to the brake cylinder 2 via branch pipe 6, passageways 30 and 48, chamber 108, groove 103 on quick service valve 101, passageway 29, chamber 130 in quick service cut-out valve device 13, grooves 141 and 140 on spool valve 139, passageway 144, part disc valve 147, chamber 146, passageway 40 and passageway and pipe 35.

As fluid under pressure flows from the brake pipe 1 to the brake cylinder 2 in the manner just described, the pressure in the chamber 130 below the diaphragm 131 of the quick service cut-out valve device 13 will increase. When the pressure in the chamber 130 has increased enough to overcome the yielding resistance of the spring 142, the diaphragm 131 will be deflected upward against the yielding resistance of this spring 142 until the follower plate 134 abuts the cover member 132.

This upward deflection of the diaphragm 131 is effective to move the valve 139 upward until the two O-ring seals 149 form seals with the wall surface of the bottomed bore 137 at locations that are respectively above and below the location at which the one end of the passageway 144 opens at this wall surface thereby cutting off further flow of fluid under pressure from the brake pipe 1 to the brake cylinder 2. The strength of the spring 142 is so selected that this cut off of flow to the brake cylinder 2 occurs when the pressure in this brake cylinder 2 reaches, for example, 9 pounds per square inch.

It is apparent from FIG. 1 that this quick service flow of fluid under pressure from the brake pipe 1 and chamber 108 to the brake cylinder 2 further increases the differential fluid pressure force acting upward on the diaphragm 99. Therefore, this force further deflects the diaphragm 99 in an upward direction thereby effecting further upward shifting of the quick service valve 101 and stem 71.

As the stem 71 continues to be moved upward, the valve 58 will be unseated from its seat 57 against the yielding resistance of springs 59 and 87. By unseating of valve 58 from its seat 57, a communication is established through which fluid under pressure is permitted to flow from the auxiliary reservoir 4 to the brake cylinder 2 via pipe and passageway 39, passageway 20, choke 24, chamber 56, thence past annular valve seat 57, and through the stepped bore 55 and passageway 22, choke 25, passageways 34 and 96, groove 94, passageway 92 and passageway and pipe 35.

SERVICE LAP

Figure 2:
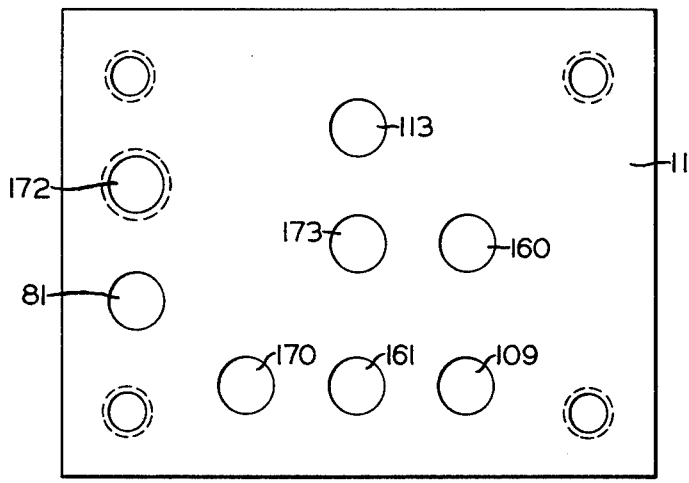
FIG. 2 is a top view of a ported horizontal gasket face formed on a pipe bracket of a brake control valve device shown in FIG. 1.
Figure 3:
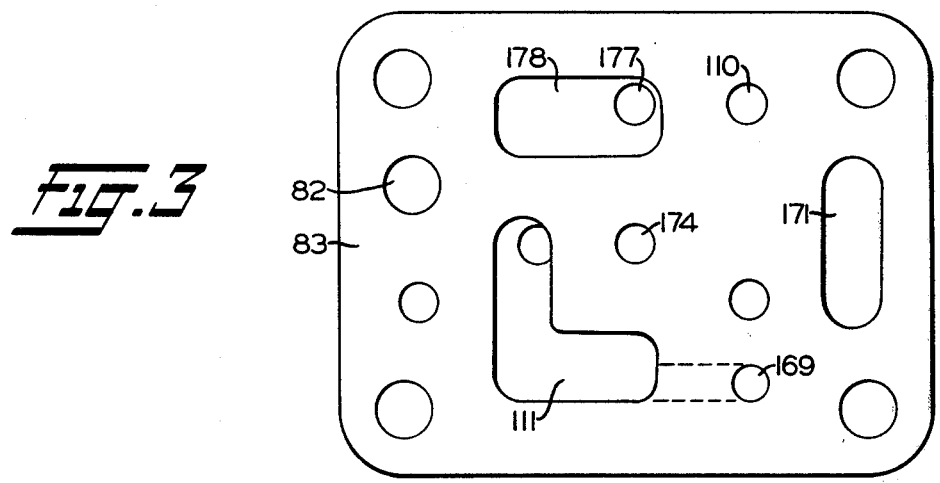
FIG. 3 is a view of a ported gasket face formed on the bottom of a valve cover that may be secured to the horizontal gasket face formed on the pipe bracket shown in FIG. 2 in either one of two positions.

As shown in FIG. 2, the chamber 107 below the diaphragm 99 is connected to the auxiliary reservoir 4 via passageways 31, 112, and 20 and passageway and pipe 39. Therefore, when the pressure in the auxiliary reservoir 4 and chamber 107 below diaphragm 99 is reduced by the flow of fluid under pressure past the unseated valve 58 to the brake cylinder 2, an amount substantially equal to the degree of reduction of brake pipe pressure in the chamber 108 above the diaphragm 99, the piston 60, supply valve 58, stem 71, quick service valve 101, spool valve 117, diaphragm follower plate 106, diaphragm follower 105 and diaphragm 99 are moved downward by the spring 59 to a service lap position in which the valve 58 is seated on its seat 57 with the upper end of the stem 71 in engagement with the bottom of the supply valve 58. This movement of the valve 58 into engagement with its seat 57 closes off further flow of fluid under pressure from the auxiliary reservoir 4 and chamber 107 to the brake cylinder.

If, after a limited application of the brakes has been effected, it is desired to increase the brake cylinder pressure, a further reduction in brake pipe pressure is effected through the medium of the engineer's brake valve device which causes the diaphragm 99 to be deflected upward to again unseat valve 58 from its seat 57 so that fluid under pressure again flows from the auxiliary reservoir 4 and chamber 107 to the brake cylinder 2.

It will be remembered that the quick service brake pipe venting action is eliminated upon a succeeding reduction in brake pipe pressure since the pressure in the chamber 130 maintains the spool valve 139 of the quick service cut-out valve device 13 in its cut-off position.

RELEASE OF A SERVICE BRAKE APPLICATION

To effect a release of the brakes after a service brake application, the engineer returns the handle of the engineer's brake valve device to its running position to effect the supply of fluid under pressure to the brake pipe 1 in the manner described in U.S. Pat. No. 2,958,561.

Fluid under pressure thus supplied to the brake pipe 1 will flow to the chamber 108 via the pathway hereinbefore described to cause an increase of the pressure in this chamber which creates a pressure differential on the diaphragm 99 that causes this diaphragm to be deflected in a downward direction.

As the diaphragm 99 is thus deflected downward, the diaphragm follower plate 106 is moved downward therewith until it abuts cover 104. The spring 87, acting through the spring seat 86, diaphragm follower 73, follower plate 75 and nut 76, will now shift the stem 71, quick service valve 101 and spool valve 117 downward until the flange 118 on valve 117 abuts the follower plate 106.

This shifting of the valve 117 reopens the communication between the chambers 108 and 107 via the passageway 119 in the valve 117. The auxiliary reservoir 4 will now be recharged from the brake pipe 1 to the normal fully charged pressure carried in the brake pipe 1.

As the valve stem 71 is shifted downward by the spring 87, as described above, the upper end of this stem 71 will be moved downward away from the bottom of the supply valve 58.

Upon movement of the upper end of the valve stem 71 away from the bottom of valve 58, all of the fluid under pressure in the brake cylinder 2 will flow to atmosphere via pipe and passageway 35, groove 94 on spool valve 95, passageways 96, 34 and 22, choke 25, upper or larger end of stepped bore 55, bottomed bore 97 and port 98 in and groove 91 on stem 71, and passageway 28 thereby effecting a direct release of the previously effected service brake application.

Furthermore, when the spring 87 shifts the quick service valve 101 downward to the position shown in FIG. 1, the O-ring seal 102 carried on this valve 101 will form a seal with the wall surface of the bore 100 below the location at which the one end of the passageway 29 opens at this wall surface. Therefore, the fluid under pressure in the chamber 130 below th diaphragm 131 of the quick service cut-out valve device 13 will now flow to atmosphere via the passageway 29, the clearance between the peripheral surface of the valve 101 and the wall surface of the bore 100, the chamber 78 and the passageway 80 which is open to atmosphere.

Upon the release of all fluid under pressure from the chamber 130 to atmosphere, the spring 142 will return to diaphragm 131 and valve 139 to the position shown in FIG. 1 thereby reestablishing a communication between the passageways 29 and 144.

EMERGENCY APPLICATION OF THE BRAKES

An emergency brake application differs from a service application only in that when all fluid under pressure is vented from the brake pipe 1 and chamber 46 below the piston 44 to atmosphere, the spring 50 moves this piston 44 and emergency valve 43 downward to the position shown in FIG. 1.

Upon movement of the emergency valve 43 to the position shown in FIG. 1, the groove 51 thereon establishes a communication between the passageways 19 and 54 thus connecting the emergency reservoir 3 to the auxiliary reservoir 4.

Accordingly, when the supply valve 58 is unseated from its seat 75, the fluid under pressure in both the emergency reservoir 3 and in the auxiliary reservoir 4 will equalize into the brake cylinder 2 thereby providing a higher brake cylinder pressure when an emergency brake application is effected than is obtained during a service brake application.

RELEASE OF AN EMERGENCY BRAKE APPLICATION

The release of an emergency brake application is the same as the release of a service brake application except as the brake pipe 1 is charged from atmospheric pressure, fluid under pressure will flow from the brake pipe 1 to the chamber 46 beneath the piston 44. As the pressure in the chamber 46 is increased, the piston 44 and emergency valve 43 are moved upward against the yielding resistance of the spring 50 until the piston 44 abuts the top cover member 49. In this position, the groove 51 on the emergency valve 43 no longer establishes a communication between the passageways 19 and 54.

The auxiliary reservoir 4 will now be charged via the spool valve 117 and the emergency reservoir 3 will be charged via the check valve 150 until the pressure in these reservoirs is the same as the normal fully charged pressure in the brake pipe 1.

B. Graduated Release Operation

Let it be supposed that it is desired to convert the brake control valve device 5 from a direct release type brake control valve device to a graduated release type brake control valve device.

The brake control valve device 5 may be converted from a direct release type brake control valve device to a graduated release type brake control valve device by first, removing the valve cover 15 and the ported gasket 15a from the gasket face 11 on the pipe bracket 5.

Next, this valve cover 15 and the ported gasket 15a are rotated, in a plane substantially parallel to the gasket face 11, through an angle of 180°.

Thereafter, the valve cover 15 and gasket 15a, in this rotated position, are again removably secured to the gasket face 11 on the pipe bracket 7, it being understood that the ported gasket 15a is disposed between the gasket face 11 and the valve cover 15 and occupies its original position with respect to the gasket face 83 on this valve cover 15.

While the valve cover 15 and ported gasket 15a are secured to the gasket face 11 on the pipe bracket 7 in this second or graduated release position, the hereinbefore-mentioned L-shaped cavity 111 (FIG. 3) that extends inward a chosen distance from the gasket face 83 on this cover 15, and a like L-shaped port in the gasket 15a, connect together the hereinbefore-mentioned port 109 (FIG. 2) in the gasket face 11, which port 109 is at that end of the passageway 31 that opens at this gasket face 11, a second port 160 in this gasket face 11, which port 160 is at that end of the passageway 36 that opens at this gasket face 11, and a third port 161 in this gasket face 11, which port 161 is at that end of the passageway 38 that opens at this gasket face 11.

Figure 4:
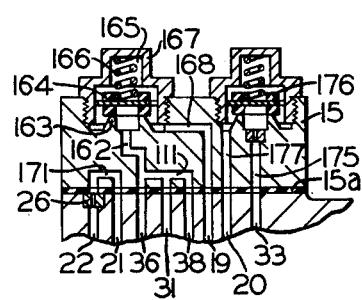
FIG. 4 is a diagrammatic view of the connections made by the valve cover with the passageways in the pipe bracket when this cover is secured to the horizontal gasket face in a graduated release position.

Provided in the valve cover 15 is a passageway that is indicated diagrammatically in FIG. 4 by the numeral 162. One end of this passageway 162 opens into the L-shaped cavity 111 (FIGS. 3 and 4) in this valve cover 15 and the other end opens within an annular valve seat 163 shown diagrammatically in FIG. 4, it being understood that this valve seat is provided within the valve cover 15.

As further shown diagrammatically in FIG. 4, a flat disc valve 164 is disposed in a chamber 165 and is normally biased against the valve seat 163 by a spring 166 that is interposed between this disc valve 164 and a screw-threaded plug 167.

Opening into this chamber 165 is one end of a passageway 168 that is provided in the valve cover 15. The opposite end of this passageway 168 opens at the gasket face 83 of this valve cover 15 via a port indicated in FIG. 3 by the numeral 169. This port 169 in the gasket face 83 of valve cover 15 is in alignment with a port 170 in the gasket face 11 of the pipe bracket 5 which port 170 is at that end of the passageway 19 in the pipe bracket 5 that opens at this gasket face 11. As shown in FIG. 1, this passageway 19 extends through the pipe bracket 7 and casing section 18 and at its other end opens at the wall surface of the bottomed bore 41.

Finally, the valve cover 15 is provided with a cavity 171 (FIG. 3) that extends inward a chosen distance from the gasket face 83 of this cover. While the valve cover 15 is secured to the gasket face 11 of the pipe bracket 7 in its graduated release position, this cavity 171 establishes a communication between the hereinbefore-mentioned port 81 (FIG. 2) in the gasket face 11 and a port 172 also in this gasket face 11. As shown in FIG. 2, this port 172 is located directly above the port 81 at such a distance therefrom as to enable the cavity 171 in the gasket face 83 of the cover member 15 to establish a communication between the passageway 21 and the passageway 22 that opens at the gasket face 11 via the port 172.

While the valve cover 15 is secured to the gasket face 11 of the pipe bracket 7 in its graduated release position, the service valve device 12 is enabled to operate in the manner of a direct release control valve device, as will now be described.

Initial Charging

When the handle of the engineer's brake valve device on the locomotive is moved to its running (i.e. release) position, fluid under pressure will be supplied to the brake pipe 1 and thence to the chambers 46 and 108 (FIG. 1) in the manner hereinbefore described.

The fluid under pressure supplied to the chamber 46 moves the piston 44 and emergency valve 43 to their upper position, and the fluid under pressure supplied to the chamber 108 flows therefrom to the chamber 107 via the passageway 119 in the valve 117, chamber 123 and choke fitting 125, and thence from the chamber 107 to the reservoir 3, which now constitutes a control reservoir, via passageway 31, cavity 111 (FIG. 4) in valve cover 15, and pipe and passageway 38 (FIG. 1) until this reservoir 3 is charged to the normal fully charged pressure carried in the brake pipe 1.

The auxiliary reservoir 4 is charged from the brake pipe 1 via passageways 30 and 33 (FIG. 1), a port 173 (FIG. 2) in the gasket face 11 on the pipe bracket 7, a port 174 (FIG. 3) in the gasket face 83 on the valve cover 15, a passageway 175 (FIG. 4) in the valve cover 15, thence past a check valve 176 (FIG. 4) to a passageway 177 that opens into a cavity 178 (FIG. 3) in the gasket face 83. This cavity 178 now registers with the port 113 (FIG. 2) which port 113, as hereinbefore stated, is at that end of the passageway 20 that opens at the gasket face 11. Therefore, fluid under pressure will flow from the cavity 178 (FIG. 3) to the auxiliary reservoir 4 (FIG. 1) via the port 113 (FIG. 2), passageway 20 (FIG. 1) and passageway and pipe 39 until this reservoir 4 is charged to the normal fully charged pressure carried in the brake pipe 1.

It may be noted from FIG. 4 that fluid under pressure can flow from the cavity 111 in the valve cover 15 to the passageway 19 in the pipe bracket 7 and casing section 18 (FIG. 1) via the passageway 162 (FIG. 4), past check valve 164 and passageway 168. Since the emergency valve 43 is now in its upper position, communication between passageways 19 and 54 is closed.

Moreover, it will be noted that fluid under pressure flows from the passageway 30 to the chamber 157 via the passageway 32 the same as for direct release operation. Consequently, diaphragm 158 and valve 159 are maintained in the position shown in FIG. 1.

SERVICE APPLICATION OF THE BRAKES

When fluid under pressure is released from the brake pipe 1 at a service rate in the manner hereinbefore described, the size of the choke fitting 125 prevents flow from the chamber 107 to the brake pipe 1 as fast as fluid under pressure is vented from the chamber 108 to atmosphere via the train brake pipe and the brake valve device.

Therefore, the diaphragm 99 will be deflected upward and communication between chambers 108 and 107 cut off in the mananer hereinbefore explained in connection with direct release operation.

This upward deflection of the diaphragm 99 will shift the quick service valve 101 and valve stem 71 upward whereupon this quick service valve 101 will first cause flow of fluid under pressure from the brake pipe 1 to the brake cylinder 2 in the manner hereinbefore explained until the quick service valve device 13 operates to cut off this flow to the brake cylinder 2.

Next, this upper shifting of the valve stem 71 effects unseating of the valve 58 from its seat 57 whereupon fluid under pressure will be supplied from the auxiliary reservoir 4 to the brake cylinder 2 in the manner hereinbefore explained in connection with direct release operation.

It will be noted from FIGS. 1 and 4, that some of the fluid under pressure supplied to the passageway 22 will flow to the chamber 79 above the diaphragm 74 via the chokes 25 and 26, cavity 171 (FIG. 4), and passageway 21 (FIG. 1), the chokes 25 and 26 in series controlling the rate of buildup of pressure in the chamber 79, and the choke 25 controlling the rate of buildup of pressure in the brake cylinder 2.

Fluid under pressure supplied to the chamber 79 in the manner explained above will increase the pressure therein and act in a downward direction on the effective area of diaphragm 74.

Upon the combined force of the spring 87 and the increasing fluid pressure force acting downward on the effective area of the diaphragm 74 slightly exceeding the force acting upward on the diaphragm 99, as the result of the reduction of the pressure in the chamber 108, the stem 71, quick service valve 101, valve 117, diaphragm follower 105 and diaphragm follower plate 106 will be moved by this force acting downward on diaphragm 99 until the spring 59 acting via the piston member 60 seats the valve 58 on its seat 57. This cuts off flow of fluid under pressure from the auxiliary reservoir 4 to the brake cylinder 2 and chamber 79.

GRADUATED RELEASE OF A SERVICE BRAKE APPLICATION

Since the operation of the brake control valve device 5 is the same in effecting either a partial or a complete graduated release of the brakes, it is believed that a description of one will suffice for both, it being understood that when a partial release of the brakes is effected, the pressure in the train brake pipe is not increased to its normal fuuly charged chosen pressure, and all the fluid under pressure in the brake cylinder 2 and chamber 79 is not released to atmosphere as is the case when a complete release is effected.

Let it be supposed tha the engineer now desires to effect a complete brake release. Accordingly, he will move the handle of the brake valve device from the position it occupies in its application zone back to its release position.

As this handle is thus returned to its release position, the brake pipe 1 is charged in the manner described in the hereinbefore-mentioned U.S. Pat. No. 2,958,561.

Fluid under pressure flows from the brake pipe 1 via the check valve 176 (FIG. 4) to charge the auxiliary reservoir 4 to the pressure carried in the train brake pipe in the manner hereinbefore described.

Fluid under pressure also flows to the chamber 108 (FIG. 1) in the manner hereinbefore described. It will be understood that the pressure in the chamber 108 is less than that in the chamber 107 for the reason that the pressure in this chamber 108 was reduced when the brake application was effected in the manner described above. Accordingly, as fluid under pressure flows from the brake pipe 1 to the chamber 108, the pressure in this chamber 108 will increase.

Upon the pressure in the chamber 108 increasing to a value that is greater than the pressure in the chamber 107, a fluid pressure force is established which acts in a downward direction on the effective area of the diaphragm 99. Therefore, as the pressure in the chamber 107 and the brake pipe 1 exceeds the pressure in the chamber 107, this differential of pressure will deflect the diaphragm 99 downward to thereby shift the diaphragm follower 105, the diaphragm follower plate 106 downward relative to the quick service valve 101 and spool valve 117 until the upper end of the counterbore 116 in the diaphragm follower 105 abuts the flange 118 on the valve 117.

When the diaphragm follower 105 is thus shifted downward until the upper end of the counterbore 116 abuts the flange 118, a communication is again established between the chambers 108 and 107 via the groove 120 on and passageway 119 in valve 117, chamber 123 and choke fitting 125.

It will be noted that upon further downward movement of the diaphragm follower 105 and diaphragm follower plate 107, the valve 117 will be moved downward therewith since the flange 118 now abuts the upper end of the counterbore 116.

It is apparent that as the valve 117 is thus moved downward, the spring 87 and fluid under pressure in the chamber 79 are rendered effective to shift the valve stem 71 and quick service valve 101 downward to maintain the lower end of this valve 101 against the upper end of the spool valve 117. Accordingly, the valve stem 71, quick service valve 101, valve 117, diaphragm follower 105 and diaphragm follower plate 106 will all be moved downward until the diaphragm follower plate 106 abuts the bottom cover member 104.

Fluid under pressure will now flow from the brake cylinder 2 to atmosphere via pipe and passageway 35, passageway 92, groove 94, passageways 96, 34 and 22, choke 25, stepped bore 55, bottomed bore 97, port 98, groove 91 and passageway 28 until all fluid under pressure is released from the brake cylinder 2 thereby completely releasing the brakes on the vehicle.

Since the chamber 79 is connected to the interior of the stepped bore 55 by the passageway 21, cavity 171, choke 26 and passageway 22 having choke 25 therein, fluid under pressure will be released from the chamber 79 to atmosphere at a rate determined by the size of the chokes 26 and 25 simultaneously as fluid under pressure is released from the brake cylinder 2 to atmosphere.

It will be noted that upon effecting a brake application in the manner described above, the fluid under pressure in the control reservoir 3 and the chamber 107 are trapped therein. Therefore, upon effecting a brake release, the pressure in the control reservoir 3 and the chamber 107 is usually the same as the normal fully charged brake pipe pressure. Accordingly, there would normally be no flow of fluid under pressure from the brake pipe 1 to the control reservoir 3 upon return of the parts of the brake control valve device 5 to their release position in which they are shown in FIG. 1 of the drawings.

If, however, the pressure in the control reservoir 3 and the chamber 107 have been reduced by, as, for example, leakage to a value less than the normal fully charged brake pipe pressure, then, upon the return of the parts of the brake control valve device 5 to their release position, as shown in FIG. 1 of the drawings, fluid under pressure will flow from brake pipe 1 and chamber 108 to the control reservoir 3 via groove 120 on and passageway 119 in spool valve 117, chamber 123, choke fitting 125, chamber 107, passageway 31, cavity 111 (FIG. 4) and passageway and pipe 38 at a rate determined by the size of the choke 125 until the pressure in the control reservoir 3 and chamber 107 is equal to the normal fully charged brake pipe pressure present in the brake pipe 1.

EMERGENCY APPLICATION OF THE BRAKES

When an emergency brake application is effected while the valve cover 15 is in its graduated release position (FIG. 4), all fluid under pressure is released from the chamber 46 (FIG. 1) and the spring 50 shifts piston 44 and emergency valve 43 to their lower position so that fluid under pressure is supplied from both the control reservoir 3 and auxiliary reservoir 4 to the brake cylinder 2 until the fluid under pressure in both the control reservoir 3 and auxiliary reservoir 4 equalize into the brake cylinder 2 thereby providing a higher brake cylinder pressure when an emergency brake application is effected the same as when the valve cover 15 occupies its direct release position.

RELEASE OF AN EMERGENCY BRAKE APPLICATION

The release of an emergency brake application, while the valve cover 15 is in its graduated release position, is the same as hereinbefore described in connection with direct release operation except in graduated release operation the auxiliary reservoir 4 is charged via the check valve 176 (FIG. 4), and the control reservoir 3 is charged via the cavity 111 (FIG. 4).

Having now described the invention, what I claim as new and desire to secure by Letters Patent, is:

1. A fluid pressure controlled vehicle brake apparatus comprising, in combination:
   a. a normally charged brake pipe, variations of the fluid pressure in which are effective to control brake applications and brake releases on the vehicle,
   b. an auxiliary reservoir normally charged to the pressure carried in said brake pipe,
   c. a second reservoir normally charged to the pressure carried in said brake pipe,
   d. fluid pressure operated braking means for effecting a brake application on the vehicle,
   e. a fluid pressure operated brake control service valve device comprising:
      i. valve means operable to effect the supply of fluid under pressure from said auxiliary reservoir to said fluid pressure operated braking means and the release of fluid under pressure from said fluid pressure operated braking means to atmosphere,
      ii. a stem coaxially arranged with respct to said valve means for effecting the operation thereof,
      iii. a first movable abutment subject on one side to the pressure of fluid in said brake pipe and subject on the opposite side to the pressure in one of said reservoirs, said first movable abutment being operatively connected to said stem to effect its movement in one direction in response to a reduction in brake pipe pressure on said one side relative to the pressure in one of said reservoirs on said opposite side to cause one end of said stem to operate said valve means to effect the supply of fluid under pressure from said auxiliary reservoir to said braking means to cause a brake application on the vehicle,
      iv. reservoir charging valve means carried on and so operable by said first movable abutment in response to said reduction in brake pipe pressure as to cut off charging of one of said reservoirs and in response to an increase in the pressure in said brake pipe to the pressure in one of said reservoirs to enable charging of one of said reservoirs,
      v. a second movable abutment that may be selectively subject on one side to the fluid under pressure supplied by said valve means to said braking means or to atmospheric pressure and subject constantly on the opposite side to atmospheric pressure, said second movable abutment being so connected to said valve stem as to, when subject on said one side to fluid under pressure supplied to said braking means, effect movement of said stem in a direction opposite said one direction in response to the force of fluid under pressure acting on said second abutment in said opposite direction slightly exceeding the fluid pressure force acting in said one direction on said first movable abutment to cause operation of said valve means to cut off flow of fluid under pressure from said auxiliary reservoir to said braking means without causing operation of said charging valve means to effect charging of one of said reservoirs, said first movable abutment being responsive to a subsequent increase in brake pipe pressure on said one side thereof to effect further movement of said stem in said opposite direction to cause said valve means to establish a venting communication whereby the fluid under pressure supplied to said braking means is released to atmosphere, and operation of said reservoir charging valve means to enable charging of one of said reservoirs, wherein the improvement comprises:
   f. selectively positionable means that, while in one of two positions, enables said opposite side of said first movable abutment to be subject to the pressure in said auxiliary reservoir, and said one side of said second movable abutment to be subject to atmospheric pressure, thereby to enable said first abutment, in response to variations of brake pipe pressure on said one side thereof, to operate said brake control service valve device in the manner of a direct release control valve device, and, while in the other of its two positions, enables said opposite side of said first movable abutment to be subject to the pressure in said second reservoir, and said one side of said second movable abutment to be subject to the pressure in said fluid pressure operated braking means, thereby to enable said first and second abutments, in response to variations of brake pipe pressure on said one side of said first abutment, to operate said brake control service valve device in the manner of a graduated release control valve device.

2. A fluid pressure controlled vehicle brake apparatus, as recited in claim 1, further characterized in that said selectively positionable means includes a check valve that, while said means is in its said one position, enables one-way flow of fluid under pressure from said brake pipe to said second reservoir.

3. A fluid pressure controlled vehicle brake apparatus, as recited in claim 1, further characterized in that said selectively positionable means includes a check valve that, while said means is in its said other position, enables one-way flow of fluid under pressure from said brake pipe to said auxiliary reservoir.

4. A fluid pressure controlled vehicle brake apparatus, as recited in claim 1, further characterized by fluid pressure operated valve means subject to the pressure in said brake pipe and operatively responsive to the release of all fluid under pressure from said brake pipe to establish a communication between said second reservoir and said auxiliary reservoir to enable the supply of fluid under pressure from both of said reservoirs to said fluid pressure operated braking means.

5. A fluid pressure controlled vehicle brake apparatus, as recited in claim 1, further characterized in that said fluid pressure operated brake control service valve device includes a quick service valve means for supplying fluid under pressure from said brake pipe to said fluid pressure operated braking means in response to a reduction of brake pipe pressure on said one side of said first movable abutment.

6. A fluid pressure controlled vehicle brake apparatus, as recited in claim 1, further characterized in that said fluid pressure operated brake control service valve device includes a quick service valve means for supplying fluid under pressure from said brake pipe to said fluid pressure operated braking means in response to a reduction of brake pipe pressure on said one side of said first movable abutment, and by valve means for cutting off said supply of fluid under pressure from said brake pipe to said fluid pressure operated braking means upon the pressure in said braking means reaching a chosen value.

7. A fluid pressure controlled vehicle brake apparatus, as recited in claim 1, further characterized by fluid pressure operated valve means operable in response to the supply of fluid under pressure thereto to effect a release of fluid under pressure from said fluid pressure operated braking means independently of said fluid pressure operated brake control service valve device.

8. A fluid pressure controlled vehicle brake apparatus, as recited in claim 1, further characterized in that said selectively positionable means comprises a valve cover member having thereon a flat face at which opens the ends of each of a plurality of passageways in said cover, and therein a plurality of check valves each enabling one-way flow through one of said plurality of passageways.

9. A fluid pressure controlled vehicle brake apparatus, as recited in claim 2, further characterized by biasing means for biasing said check valve in the direction to prevent flow of fluid under pressure from said brake pipe to said second reservoir until the pressure in said brake pipe exceeds a chosen value.

10. A fluid pressure controlled vehicle brake apparatus, as recited in claim 3, further characterized by biasing means for biasing said check valve in the direction to prevent flow from said brake pipe to said auxiliary reservoir until the pressure in said brake pipe exceeds a chosen value.

11. A fluid pressure controlled vehicle brake apparatus, as recited in claim 5, further characterized in that said quick service valve means comprises a spool-type valve disposed between said stem and said first movable abutment and constituting an operable connection therebetween whereby said first movable abutment is enabled to effect movement of said stem in said one direction.

12. A fluid pressure controlled vehicle brake apparatus, as recited in claim 6, further characterized by a one-way flow valve means providing flow of fluid under pressure from said cut-off valve means to said fluid pressure operated braking means to prevent loss of fluid under pressure supplied to said braking means by said fluid pressure operated brake control service valve device should said cut-off valve means become so damaged as to open a communication from said one-way flow valve means to atmosphere.

* * * * *